Patented July 29, 1952

2,605,249

UNITED STATES PATENT OFFICE 2,605,249

MIXTURE OF ANTIOXIDANTS FOR SYNTHETIC RUBBER

Harry E. Albert, Akron, Ohio, assignor to The Firestone Tire & Rubber Company, Akron, Ohio, a corporation of Ohio No Drawing. Application December 30, 1949, Serial No. 136,148

8 Claims. (Cl. 260—45.9)

This invention relates to the stabilization of rubber-like materials. The stabilizer employed is a mixture of a thiodiarylamine, such as thiodiphenylamine (phenothiazine) and a phenol sulfide. The invention includes the use of the stabilizer and the stabilized product. It includes the process of stopping the polymerization of rubber-like monomers with a phenol sulfide and then adding a thiodiarylamine to the resulting latex to obtain a rubber-like product which includes the stabilizer mixture.

It is well known that the synthetic copolymer known as GR–S, and like copolymers slowly polymerize in both the uncured and cured states and also oxidize. The stabilizing mixture of this invention retards or inhibits such oxidation and continued polymerization.

It has previously been suggested that thiodiphenylamine (one of the ingredients of the stabilizer of this invention) be used as a stabilizer for rubber and rubber-like synthetics. However, this material is essentially aromatic in nature and is incompatible with either natural rubber or the usual rubber-like polymeric materials when used in any more than a small amount.

The stabilizer of this invention is a mixture of a thiodiarylamine and a phenol sulfide. The thiodiarylamine is used in a small amount which is thoroughly compatible with the copolymer, and it is used together with a phenol sulfide. The effect of the two together is synergistic, giving better stabilization than either material alone.

The thiodiarylamines include thiodiphenylamines and thiodinaphthylamines. They include, for example, thiodiphenylamines having the following formula:

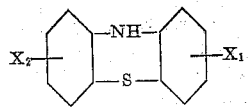

in which $X_1$ and $X_2$ may be the same or different and include hydrogen, hydroxy, halogen, $NO_2$, CN, ether groups as for example $CH_3O$, $C_2H_5O$, etc. and alkyl groups as for example $C_2H_5$, $C_4H_9$, $C_7H_{15}$, etc. As illustrative of the compounds there may be mentioned:

Thiodi(3,6-dichlorophenyl)amine
Thiodi(3,6-dimethylphenyl)amine
Thiodi(3,6-diheptylphenyl)amine
Thiodi(1,8-diethylphenyl)amine The phenol sulfides used in carrying out this invention may be substituted and are represented by the following generic formula:

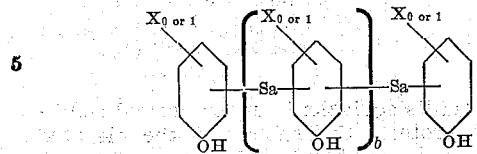

where X is an alkyl hydrocarbon substituent if present, $a$ is an integer from 1 to 4 (preferably 1 or 2), and $b$ is zero or any integer 1, 2, 3 ... up to any number (preferably 1 or 2). Thus, the preferred diphenol sulfides are diphenol monosulfide, triphenol di(monosulfide), and tetraphenol tri(monosulfide). Diphenol polysulfide and other compounds having more than one sulfur atom between each two nuclei, contain sulfur which on liberation has a vulcanizing action; and such materials, therefore, are generally not as desirable as the monosulfides. Cresol (ortho, meta and para), xylenol, ethylphenol, etc., sulfides may be used, but the unsubstituted compounds are preferred.

It is known to the prior art that phenol sulfides can be prepared by the reaction of phenolic compounds with sulfur monochloride or sulfur dichloride in an inert solvent, such as carbon tetrachloride, ethylene dichloride, etc. Where $a$ is equal to 3 or 4, additional sulfur must be added after completion of the sulfur monochloride reaction. Since the preferred products are those in which $a$ equals 1, sulfur dichloride is generally used for these preparations. It is more desirable to prepare these products in a cold solvent (0–20° C.) than in solvent at higher temperatures, such as the reflux temperature of carbon tetrachloride (76–77° C.). The low-temperature product gives better results than the product prepared at the higher temperature when crude products are compared. Furthermore, a better yield of purified monosulfide can be obtained from the low-temperature product if for some reason it is desired to utilize the purified material.

Thiodiphenylamine may be used in amounts up to about 5 per cent (based on the weight of the copolymer) and may comprise anywhere from 10 to 90 per cent of the combined weight of the thiodiphenylamine and the phenol sulfide. The phenol sulfide may constitute anywhere from about 10 to 90 per cent of the combined weight of the thiodiphenylamine and polyphenol sulfide. It is preferred to use concentrations of thiodiphenylamine below 2 per cent (based on the weight of the copolymer) because at this and higher concentrations up to and including 5 per cent, for example, this material blooms to the surface of GR-S. However, if cured before blooming occurs, the vulcanizate does not bloom. The combined weight of the thiodiphenylamine and phenol sulfide may range from, for example, 0.2 to 10 per cent (based on the weight of the copolymer). Thus, the practical limits for use of the two ingredients in combination are for the thiodiarylamine about 0.10 per cent to 5.0 per cent of the rubber-like material and for the phenol sulfide about 0.10 per cent to 9.9 per cent of the rubber-like material.

The stabilizer is effective in retarding the oxidation and continued polymerization of the copolymer and its equivalents under normal conditions. It protects the rubber at the elevated temperatures encountered in the cure and use of rubber-like products, such as automobile tires, etc. The stabilizer is of general application for this purpose.

The following relates to the stabilization of the rubber-like copolymer of butadiene and styrene known as GR-S rubber, in the uncured state. The stabilizer now commonly employed with such a product is phenyl beta-naphthylamine. The following table compares the use of thiodiphenylamine and phenol sulfides alone and in combination, with phenyl beta-naphthylamine. Only 1 per cent of thiodiphenylamine was used in this test because this amount is well within the range where no blooming occurs. The effect of the various stabilizers is recorded as indicated by extrusion plasticity and by a hand test made to measure the stiffening which has occurred.

Other comparable tests made under similar conditions with plasticities measured in the same manner on GR-S rubber after drying twenty hours at 75° C. and heat-aging for 1, 2, and 4 days at 90° C. are recorded in the following table which includes figures for extrusion plasticity obtained in tests with an instrument of the type described in U. S. Patent 2,045,548 to J. H. Dillon et al. and known as the Firestone Extrusion Plastometer. The plasticity figures represent the time in seconds required to extrude a constant volume of rubber through a given opening by action of a piston activated by a constant pressure of 8¼ pounds air at a constant temperature of 185° F.

| Material | After Drying 20 Hours at 75° C. | Heat Aged at 90° C. | | |
|---|---|---|---|---|
| | | One Day | Two Days | Four Days |
| 2% diphenol sulfide | 10.3, No deterioration | No change | 27.2, No change. | 42.6, Slight to somewhat set up. |
| 2% triphenol bi(monosulfide) | 12.2, No deterioration | ___do___ | 37.0, No change. | 43.6, Slight to somewhat set up. |
| 1% thiodiphenylamine+1% triphenol bi(monosulfide). | 5.1, No deterioration | ___do___ | 11.0, No change. | 26.0, No change. |

In preparing the samples for all of the above tests, the proper amount of the stabilizer or mixture of stabilizers was added to the latex either in solution or water dispersion. The latex was then coagulated with crude aluminum sulfate solution. The coagulum was washed with water on a mill by a standard procedure. It was then dried at 75° C. for twenty hours, and its condition noted and recorded. The heat-aging of the dried copolymer at 90° C. was then started.

Other tests were made to show the synergistic effect of the materials on one another in mixtures containing as little as 10 per cent of one of the ingredients. The compounds and mixtures described in the following table were added to GR-S latex, which was then coagulated with aluminum sulfate, dried and then subjected to accelerated aging in an oven.

*Oven Aging at 90° C.*

| Stabilizer | 2 Days | 4 Days | 6 Days | 8 Days |
|---|---|---|---|---|
| 2% thiodiphenylamine | Brown; shiny, softened. | Brown; shiny, slightly set up. | Brown; shiny set up. | Brown shiny cured. |
| 1.8% thiodiphenylamine, .2% diphenol monosulfide. | Brown; somewhat shiny, softened. | ___do___ | Brown; shiny, somewhat set up. | Brown; shiny, somewhat set up. |
| 1% thiodiphenylamine, 1% diphenol monosulfide. | Medium brown; No deterioration. | Greenish brown; No change. | Medium brown; somewhat shiny. | Medium brown; slight to somewhat set up. |
| .2% thiodiphenylamine, 1.8% diphenol monosulfide. | ___do___ | Medium brown; No deterioration. | Medium brown; Very slightly set up. | Medium brown; somewhat set up. |
| 2% diphenol monosulfide | ___do___ | Brown; somewhat set up. | Medium brown; set up. | Medium brown; cured. |

The results show that using either of the ingredients alone, without the other, the GR-S

| Material | After Drying 20 Hours at 75° C. | Heat Aged at 90° C. | | |
|---|---|---|---|---|
| | | One Day | Two Days | Four Days |
| 2% phenyl betanaphthylamine | No deterioration | No change | Surface shiny | Surface shiny, slightly set up. |
| 1% thiodiphenylamine | ___do___ | ___do___ | ___do___ | Surface shiny. |
| 1% triphenol bi(monosulfide) | ___do___ | ___do___ | No change | Somewhat set up. |
| 2% triphenol bi(monosulfide) | ___do___ | ___do___ | ___do___ | Very slightly set up. |
| 1% diphenol monosulfide +1% thiodiphenylamine. | ___do___ | ___do___ | ___do___ | No change. |
| 1% triphenol bi(monosulfide)+1% thiodiphenylamine. | ___do___ | ___do___ | ___do___ | Do. |
| 1.5% triphenol bi(monosulfide)+.5% thiodiphenylamine. | ___do___ | ___do___ | ___do___ | Do. |
| 1.75% triphenol bi(monosulfide)+.25% thiodiphenylamine. | ___do___ | ___do___ | ___do___ | Do. | copolymer was "cured" after heating four days at 90° C. Using as little as one part of either ingredient with nine parts of the other prevented this, showing the mixture to be a better stabilizer than either ingredient alone.

The effect of the combined stabilizers on a vulcanizate is illustrated by the following tests. The stabilizer was mixed with GR-S latex before coagulation, and the dried copolymer was compounded as follows:

|  | Parts by weight |
|---|---|
| GR-S plus 2% stabilizer | 100.0 |
| Bardol | 3.0 |
| Pine tar | 3.0 |
| Stearic acid | 3.0 |
| Zinc oxide | 5.0 |
| Accelerator | 1.2 |
| Channel black | 50.0 |
| Sulfur | 2.0 |

The Bardol is a coal-tar distillate commonly used as a softener and manufactured by the Barrett Division of Allied Chemical and Dye Corporation. The accelerator used was cyclohexyl benzothiazyl sulfenamide.

The mixtures were cured and part of each vulcanizate was aged in an air bomb for ten hours under 60 pounds pressure at 200° F. and then tested. Another part of each vulcanizate was aged for 4 days in an oven at 212° F. Tests made on the aged products are tabulated below to compare the effect of 2 per cent of phenol bi(monosulfide) with a mixture of 1 per cent of phenol bi(monosulfide) and 1 per cent thiodiphenylamine. The figures are averages obtained for materials cured for 40, 60, 80 and 120 minutes, respectively, at 280° F.

| Test | 2% triphenol bi(monosulfide) | 1% triphenol bi(monosulfide) + 1% thiodiphenylamine |
|---|---|---|
| 300% Modulus: Normal | 895 | 905 |
| 200% Modulus: | | |
| Air-bomb aged | 1,890 | 1,760 |
| Oven aged | 2,030 | 1,760 |
| Tensile: | | |
| Normal | 2,280 | 2,225 |
| Air-bomb aged | 2,070 | 2,020 |
| Percent of normal | 90.8 | 90.9 |
| Oven aged | 2,080 | 2,100 |
| Percent of normal | 91.3 | 94.3 |
| Elongation: | | |
| Normal | 431 | 429 |
| Air-bomb aged | 220 | 238 |
| Percent of normal | 51.0 | 55.5 |
| Oven aged | 205 | 206 |
| Percent of normal | 47.6 | 48.0 |

The above results show advantages for the use of a combination of thiodiphenylamine and a phenol sulfide to be a lower aged 200 per cent modulus although the normal moduli are about equal, a better per cent aged tensile in oven aging, and a better per cent aged elongation in air-bomb aging.

Other tests were made on GR-S vulcanizate prepared by a similar formula to compare the effect of a mixture of thiodiphenylamine and diphenol sulfide, with the effect of both thiodiphenylamine and phenyl beta-naphthylamine used alone. Averages of four different cures in these tests are recorded in the following table:

| Test | 2% phenyl beta-naphthylamine | 1% thiodiphenylamine | 1% thiodiphenylamine + 1% diphenol sulfide |
|---|---|---|---|
| 300% Modulus: Normal | 455 | 505 | 480 |
| 200% Modulus: | | | |
| Air-bomb aged | 1,250 | 1,325 | 1,350 |
| Oven aged | 1,475 | 1,800 | 1,375 |
| Tensile: | | | |
| Normal | 2,800 | 3,025 | 2,900 |
| Air-bomb aged | 1,900 | 2,150 | 2,075 |
| Percent of normal | 65.6 | 71.0 | 71.5 |
| Oven aged | 2,400 | 2,225 | 2,275 |
| Percent of normal | 85.6 | 73.5 | 78.5 |
| Elongation: | | | |
| Normal | 673 | 679 | 649 |
| Air-bomb aged | 298 | 328 | 305 |
| Percent of normal | 44.3 | 48.2 | 47.2 |
| Oven aged | 319 | 253 | 305 |
| Percent of normal | 47.3 | 37.3 | 47.0 |

The above results show the following advantages for the use of 1 per cent of thiodiphenylamine and 1 per cent of diphenol sulfide over the use of 1 per cent of thiodiphenylamine alone: A lower over-aged 200 per cent modulus, a higher per cent retention of tensile after oven-aging, and a considerably higher retention of elongation after oven-aging. The advantages for the combination of thiodiphenylamine and diphenol sulfide, over the use of 2 per cent of phenyl-beta-naphthylamine (a widely used, commercial antioxide) as shown by the above results are, the same aged modulus (average of air-bomb and oven-aged values) in spite of a slightly higher initial modulus, and a higher per cent retention of elongation in bomb-aging. The tables show, also, an advantage for 2 per cent of the combination over 2 per cent phenol sulfide.

A mixture of 25 per cent of thiodiphenylamine and 75 per cent of diphenol sulfide is recommended for commercial use at the present relative prices of these two materials. Tests were made on GR-S copolymer obtained by adding the 1.5 per cent of the two materials in this ratio (based on the weight of the copolymer) to a large batch of copolymer latex. The effects of the mixture were compared with that of the widely used phenyl-beta-naphthylamine (referred to in the following tables as P. B. N. A.). The two copolymers were compounded for use as tread stocks, and a portion of each vulcanizate was aged four days at 212° F.

*Vulcanizates prepared from unaged copolymer*

| Antioxidant | 1.5% P. B. N. A. | 1.5% Mixture |
|---|---|---|
| Tensile Strength: | | |
| Normal | 2,825 | 2,725 |
| Aged | 2,250 | 2,183 |
| Percent Retained | 79.6 | 80.2 |
| Elongation: | | |
| Normal | 663 | 697 |
| Aged | 280 | 307 |
| Percent Retained | 42.2 | 44.0 |

The above copolymer samples, each containing 1.5 per cent (based on the weight of the copolymer) of one of the anti-oxidants were both aged under usual storage conditions for one year, and then similarly compounded for use as a tire tread.

The vulcanizates were tested with the following results:

*Vulvcanizates prepared from aged copolymer*

| Antioxidant | 1.5% P.B.N.A. | 1.5% Mixture |
|---|---|---|
| Tensile: | | |
| Normal | 2,742 | 2,775 |
| Aged | 2,175 | 2,192 |
| Percent Retained | 79.2 | 79.1 |
| Elongation: | | |
| Normal | 693 | 680 |
| Aged | 262 | 260 |
| Percent Retained | 36.4 | 38.2 |

The above results show the mixture of thiodiphenylamine and diphenol sulfide to be as good as the commercial stabilizer, or better.

It is known that the phenol sulfides are stopping agents, terminating the emulsion copolymerization of monomers such as those mentioned above. It is also known that stopping agents used for this purpose effectively terminate the copolymerization as a chemical reaction, but do not prevent subsequent slow copolymerization which ensues during subsequent storage and use of the copolymer and vulcanizate. Antioxidants are employed to retard or inhibit such subsequent change in the copolymer.

According to a preferred method of incorporating the mixture of this invention in the copolymer, all or a part of the diphenol sulfide is used as a stopping agent. The thiodiphenylamine is added after completion of the copolymerization. The following illustrates the addition of all of the diphenol sulfide as a stopping agent. Different amounts were employed in the different examples, and copolymers of different plasticities were produced. In each case the emulsion of monomers was prepared according to the following formula:

| | Parts by weight |
|---|---|
| Water | 180 |
| Sodium tallow soap | 5 |
| Potassium persulfate | 0.03 |
| Styrene | 25 |
| Dodecyl mercaptan | 0.52 |
| Butadiene-1,3 | 75 |

Several runs were used employing different amounts of the stopping agent. Also Mooney plasticities were run on the various batches after adding the stopping agent to determine how effective it had been. The top part of the following table shows how much diphenol sulfide and how much thiodiphenylamine was used in each case, and in several instances there is a record of the Mooney of the final product obtained by precipitation with sodium chloride and sulfuric acid. The bottom part of the table records the total solids (T. S.) in the emulsion of each batch and a quick alcoholic Mooney determination (ML4) made for control purposes. The abbreviations "DRB" and "per 100" mean, respectively, the per cent of each ingredient added, figured on the dry rubber basis, and the parts per weight of each ingredient figured on the basis of 100 parts of the total monomers present.

| Batch | A | B | C | D |
|---|---|---|---|---|
| Diphenol sulfide, DRB | 1.305 | 1.565 | 0.94 | 0.783 |
| Diphenol sulfide, per 100 | 0.94 | 1.125 | 0.675 | 0.584 |
| Thiodiphenylamine, DRB | 0.43 | 0.521 | 0.31 | 0.259 |
| Thiodiphenylamine, per 100 | 0.31 | 0.375 | 0.225 | 0.186 |
| NaCl-H₂SO₄, ML4 | 55 | | | 25 |

| Holding Time (Hours) | T. S. | ML4 | T. S. | ML4 | T. S. | ML4 | T. S. | ML4 |
|---|---|---|---|---|---|---|---|---|
| 0 | 28.0 | 80 | 28.1 | 88 | 29.0 | 75 | 27.5 | 42 |
| 4 | 27.7 | 80 | 28.6 | 88 | 28.4 | 74 | 27.3 | 45 |
| 8 | 28.7 | 79 | 28.0 | 80 | 28.4 | 77 | | |
| 16 | 28.4 | 77 | 28.6 | 86 | 28.4 | 74 | | |
| 24 | 28.7 | 77 | 28.1 | 81 | 28.4 | 76 | | |
| 61 | | | | | | | 26.5 | 41 |

It is seen that the diphenol sulfide was an effective stopping agent in each case. After the holding period in which the above determinations were made to check whether the copolymerization reaction had been stopped, unreacted monomer was stripped from the reaction mixture and the indicated amount of thiodiphenylamine was added as a 40 per cent dispersion. The batches were then coagulated with sodium chloride and sulfuric acid in the usual way and dried at 160° F. The dried batches of GR–S contained the indicated amounts of the two ingredients, the ratio in each case being 75 parts of the diphenol sulfide to 25 parts of the thiodyphenylamine. Each material on curing gave a satisfactory vulcanizate.

The above formulae and test results are illustrative. The mixed stabilizer is used to advantage in any rubber-like polymer or copolymer in the uncured state to prevent oxidation and continued polymerization. For instance, it is used to advantage to prevent oxidation and continued polymerization of a polymeric material during the drying of the mass obtained by coagulation of a latex of the material. It is also used to advantage in any vulcanizate, whether the vulcanizate be of natural rubber or a rubber-like polymer or copolymer. It is better than the thiodiphenylamine alone, which cannot be used commercially in excess of about 1 per cent. The results also indicate that it is better than the use of a phenol sulfide alone.

This application is a continuation-in-part of my application Serial No. 611,921, filed August 21, 1945, now abandoned.

What I claim is:

1. Rubber-like copolymer of butadiene and styrene stabilized with a relatively small amount of a mixture of thiodiarylamine and a phenol sulfide which contains no more than four phenol groups, which mixture contains (a) 0.1 to 5.0 per cent of a thiodiarylamine and (b) 0.1 to 9.9 per cent of the phenol sulfide on the weight of the copolymer.

2. Rubber-like copolymer of butadiene and styrene stabilized with a relatively small amount of a mixture of thiodiphenylamine and a phenol sulfide containing no more than four phenol groups, which mixture contains 0.1 to 5.0 per cent of thiodiphenylamine and 0.1 to 9.9 per cent of the phenol sulfide on the weight of the copolymer.

3. Rubber-like copolymer of butadiene and styrene stabilized with a relatively small amount of a mixture of thiodiphenylamine and a phenol monosulfide which contains no more than three phenol groups, which mixture contains 0.1 to 5.0 per cent of thiodiphenylamine and 0.1 to 9.9 per cent of the phenol sulfide on the weight of the copolymer.

4. Vulcanized rubber-like copolymer of butadiene and styrene stabilized with a mixture of thiodiphenylamine and a phenol sulfide which contains no more than four phenol groups, which mixture contains 0.1 to 5.0 per cent of the thiophenylamine and 0.1 to 9.9 per cent of the phenol sulfide based on the weight of the copolymer.

5. Vulcanized rubber-like copolymer of butadiene and styrene stabilized with a mixture of thiodiphenylamine and a phenol monosulfide containing no more than three phenol groups, which mixture contains 0.1 to 5.0 per cent of the thiodiphenylamine and 0.1 to 9.9 per cent of the phenol sulfide based on the weight of the copolymer.

6. The method of drying uncured rubber-like copolymer of butadiene and styrene which comprises heating the same in admixture with a mixture of thiodiphenylamine and a phenol sulfide which contains no more than four phenol groups, which mixture contains 0.1 to 5.0 per cent of the thiodiphenylamine and 0.1 to 9.9 per cent of the phenol sulfide based on the weight of the copolymer.

7. The method of drying uncured rubber-like copolymer of butadiene and styrene which comprises heating the same with a mixture of thiodiphenylamine and a phenol monosulfide which contains no more than four phenol groups, which mixture contains 0.1 to 5.0 per cent of the thiodiphenylamine and 0.1 to 9.9 per cent of the phenol sulfide based on the weight of the copolymer.

8. The method of curing a rubber-like copolymer of butadiene and styrene which comprises heating the same in the presence of vulcanizing ingredients including sulfur, and a mixture of thiodiphenylamine and a phenol monosulfide containing no more than four phenol groups, which mixture contains 0.1 to 5.0 per cent of the thiodiphenylamine and 0.1 to 9.9 per cent of the phenol sulfide based on the weight of the copolymer.

HARRY E. ALBERT.

REFERENCES CITED

The following references are of record in the file of this patent:

UNITED STATES PATENTS

| Number | Name | Date |
| --- | --- | --- |
| 1,950,438 | Lightbown et al. | Mar. 19, 1934 |
| 2,310,449 | Carothers et al. | Feb. 9, 1943 |

OTHER REFERENCES

Dunbrook: India Rubber World, January 1948, pp. 486–552.